United States Patent [19]
Byzitter

[11] Patent Number: 4,854,336
[45] Date of Patent: Aug. 8, 1989

[54] TEAT CUP DISINFECTANT SYSTEM

[76] Inventor: Martin Byzitter, P.O. Box 668, Rocky Mountain House, Alberta TOM 1TO, Canada

[21] Appl. No.: 225,932

[22] Filed: Jul. 29, 1988

[51] Int. Cl.⁴ .............................................. B08B 3/04
[52] U.S. Cl. .............................. 134/104.1; 134/166 R; 134/171; 134/186
[58] Field of Search ................... 134/166 R, 170, 104, 134/168 R, 169 R, 171, 186, 199, 104.1; 119/1

[56] References Cited
U.S. PATENT DOCUMENTS

| | | | |
|---|---|---|---|
| 2,435,807 | 2/1948 | Udell | 134/170 |
| 2,788,008 | 4/1957 | Wanzer | 134/170 |
| 3,713,423 | 1/1973 | Sparr, Sr. | 119/1 |
| 4,305,346 | 12/1981 | Sparr, Sr. | 119/1 |
| 4,730,631 | 3/1988 | Schwartz | 134/166 X |
| 4,748,007 | 5/1988 | Gaudion et al. | 134/170 |

Primary Examiner—Frankie L. Stinson
Attorney, Agent, or Firm—Harold H. Dutton, Jr.

[57] ABSTRACT

The conventional method of cleaning the teat cups of a milking machine head is to immerse all of the heads in a single container of cleaning fluid. A simple, effective alternative is an open topped casing installed at each milking stall, the casing including a flat top plate, four wells dependent therefrom for receiving the teat cups individually, an inlet duct in the bottom center of each well, an H-shaped manifold for receiving cleaning fluid from a source thereof and for feeding the fluid to the wells, and an outlet in the bottom of each well near one side thereof for discharging cleaning fluid from the casing.

3 Claims, 2 Drawing Sheets

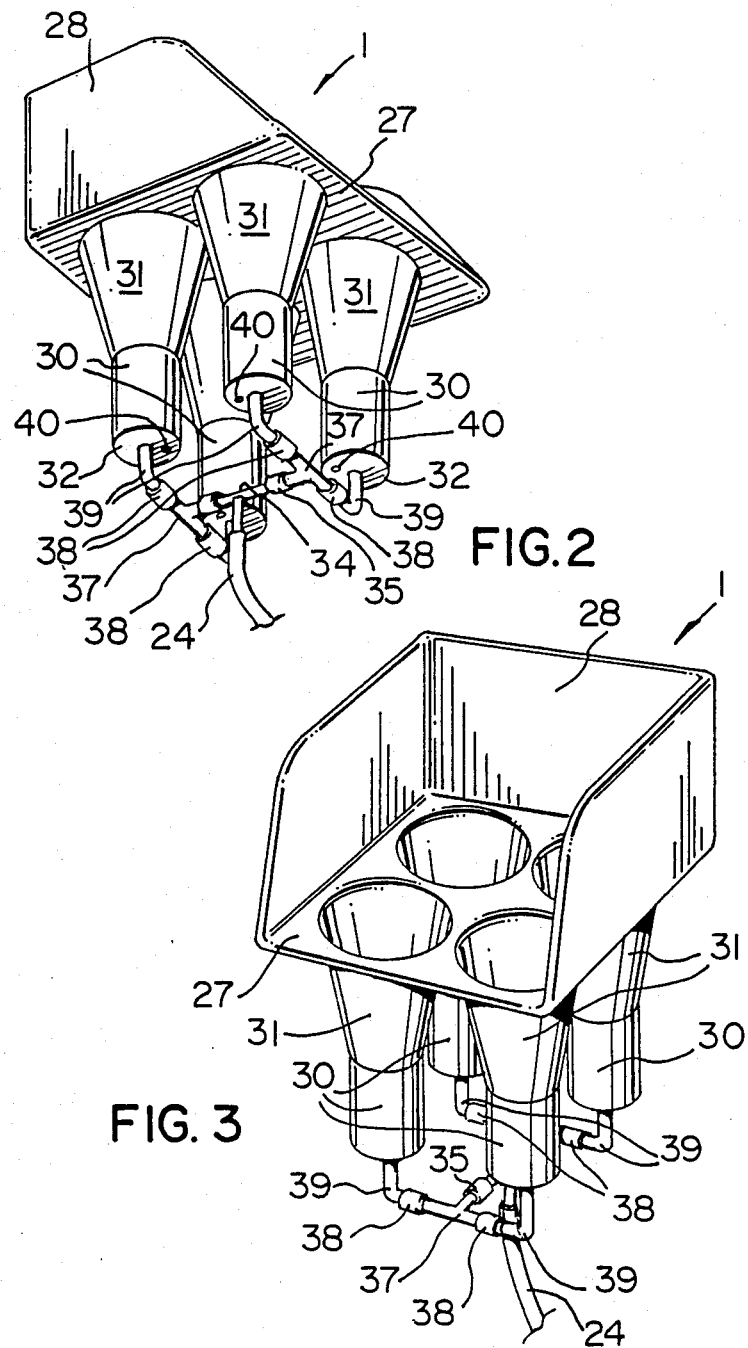

TEAT CUP DISINFECTANT SYSTEM

BACKGROUND TO THE INVENTION

This invention relates to a teat cup cleaning apparatus.

Teat cups of the type used in milking parlors require regular cleaning and disinfecting to avoid the occurrence of udder and other diseases. The usual practice is to clean and disinfect both the udders and the teat cups after each milking operation. If one set of teat cups is used to milk more than one cow, the teat cups must be thoroughly cleansed between each milking operation. As proposed in U.S. Pat. No. 2,228,698, which issued to J. W. Fitches on Jan. 14, 1941, cleaning is commonly effected by dropping all of the teat cups into a single container of liquid. Single udder cleaning cups are described in U.S. Pat. Nos. 3,713,423 and 4,305,346, which issued to A. V. Sparr, Sr. on Jan. 30, 1973 and Dec. 15, 1981, respectively.

Cleaning in a single large container is not the most desireable solution to the cleaning problem. In the absence of agitation, uniform and thorough distribution of cleansing agent to all teat cups may not occur. Moreover, carrying cleaning solution from one stall to another is not particularly easy or desirable.

The object of the present invention is to solve the above identified problems by providing a relatively simple teat cup cleaning apparatus which can be installed in each milking stall, and which ensures thorough teat cup cleaning.

BRIEF SUMMARY OF THE INVENTION

Accordingly, the present invention relates to an apparatus for cleaning teat cups comprising casing means, said casing means including wall means for receiving teat cups individually and separately; inlet duct means for introducing washing liquid into the bottom of each said well means; manifold means for receiving the washing liqiuid from a source thereof and feeding the liquid to said inlet duct means; and outlet means in said well means for discharging liquid from said casing means.

BRIEF DESCRIPTION OF THE DRAWINGS

The invention will be described in greater detail with reference to the accompanying drawings, which illustrate a preferred embodiment of the invention, and wherein:

FIG. 2 is a perspective view from below of a teat cup cleaning apparatus in accordance with the present invention; and FIG. 3 is a perspective view from above of the apparatus of FIG. 2.

With reference to FIG. 1, the apparatus of the present invention is intended for use in a milking parlor of the type including a plurality of stalls for receiving individual cows. The apparatus includes a plurality of discrete casings generally indicated at 1 for receiving teat cups (not shown). A casing 1 is provided for each milking stall. The casings 1 are mounted in a ledge 2 suspended on rods 3 above the floor 4 of the milking parlor for facilitating access thereto.

Figure 1:
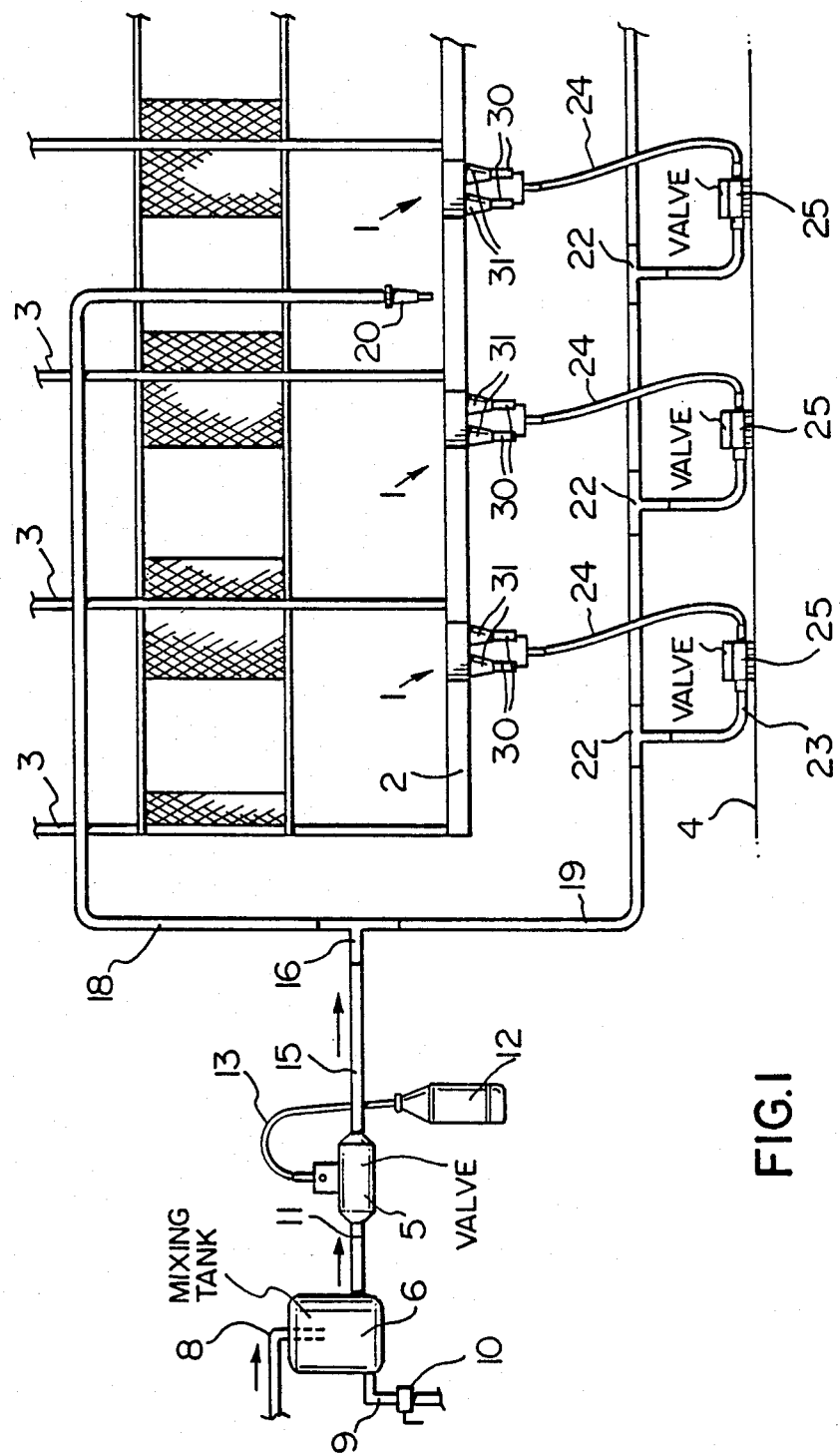
FIG. 1 is a schematic block diagram of a portion of a milking parlor incorporating the apparatus of the present invention.

A solution of a disinfectant is produced in a venturi valve 5. Water is introduced into a mixing tank 6 through a pipe 8. A drain 9 with a valve 10 is provided in the tank 6. The tank 6 is used to mix hot and cold water for controlling the temperature of water flowing through a tube 11 from the tank 6 to the valve 5. Disinfectant is drawn from a container 12 through a tube 12 into the valve 5 for creating a cleaning solution. The solution passes through a tube 15 and a T-joint 16 to a pair of tubes 18 and 19. A nozzle 20 of the type used on a garden hose is provided on the free end of the tube 18. Liquid spraying from the nozzle 20 is used to wash udders following a milking operation. A plurality of T-joints 22 are provided in the tube 19. The number of joints 22 is equal to the number of casings 1, the former feeding cleaning liquid through tubes 23 and 24, and a foot operated valve 25 to the casing 1.

As best shown in FIGS. 2 and 3, each of the casings 1 includes a planar, square top plate 27 with a flange 28 extending upwardly from three sides thereof for strengthening the casing. Four cylindrical cups 30 with open, downwardly tapering top ends 31 extend downwardly from the top plate 27. The cups 30 are spaced equidistant apart, their longitudinal axes defining the corners of a square. The cups 30 define wells for receiving the four udder cups of a milking machine head.

Cleaning liquid is introduced into the center of the circular bottom wall 32 of each cup 30 through the tube 24 and an H-shaped manifold. The manifold is defined by a T-joint 34 on the top of the tube 24, tubes 35 on the outer ends of the top arm of the T-joint 34, T-joints 37, tubes 38 and elbow joints or couplers 39. The cleaning fluid is discharged through a small outlet opening 40 in the bottom wall 32 of the cup 30 near one side thereof.

In operation, following a milking operation, the teat cups are placed in the wells 30, i.e. one cup is placed in each well 30, and the appropriate valve is opened. Cleaning solution passes through the tube 24 and the manifold beneath the casing 1 into the inlet ducts defined by the joints 39 and the bottom ends of the wells 30. Because the outlet openings 40 are smaller than the internal diameter of the inlet ducts, the cleaning fluid more or less fills the wells 30 to cover the test cups. When the flow of fluid into the wells 30 stops, the cleaning fluid drains completely through the openings 40.

Thus, there has been described a relatively simple apparatus for cleaning teat cups. Because the casing 1 is a one piece, molded structure, the apparatus is inexpensive to produce and easy to maintain.

What is claimed is:

1. A system for cleaning teat cups in a plurality of individual stalls in a milking parlor comprising:
    a cleaning solution mixing and supply station;
    means for delivering cleaning solution from said mixing and supply station to each of said stalls, and valve means associated with each stall for controlling the delivery of cleaning solution to each said stall;
    each said stall having a casing mounted on a support, said casing including a plurality of wells for receiving individual teat cups; said casing including an upper support plate having an upstanding reinforcing flange thereon, each of said wells comprising a cylindrical cup connected to said support plate through an inverted frustoconical top portion, means defining fluid communication with said valve means for introducing cleaning solution into said well at the bottom thereof, a drain opening in the bottom of each said well, whereby fluid may flow into said wells at a faster rate than it may flow out of said opening for filling said wells and will drain completely from said wells when the flow of incoming fluid is stopped by said valve means.

2. An apparatus according to claim 1, wherein said reinforcing flange extends around three sides of said support plate.

3. A system as in claim 1 and wherein said means defining fluid communication comprises a manifold for supplying cleaning solution from said valve means includes a manifold for supplying cleaning solution to each of said wells.

* * * * *